(12) United States Patent
Schmale

(10) Patent No.: US 7,926,875 B2
(45) Date of Patent: Apr. 19, 2011

(54) MEMORY MECHANISM

(75) Inventor: Uwe Schmale, Huckeswagen (DE)

(73) Assignee: Johnson Controls Technology Company, Holland, MI (US)

( * ) Notice: Subject to any disclaimer, the term of this patent is extended or adjusted under 35 U.S.C. 154(b) by 380 days.

(21) Appl. No.: 11/659,301

(22) PCT Filed: Aug. 4, 2005

(86) PCT No.: PCT/EP2005/053848
§ 371 (c)(1),
(2), (4) Date: Dec. 10, 2008

(87) PCT Pub. No.: WO2006/032574
PCT Pub. Date: Mar. 30, 2006

(65) Prior Publication Data
US 2009/0200849 A1    Aug. 13, 2009

(30) Foreign Application Priority Data

Aug. 6, 2004   (DE) .................... 10 2004 038 587

(51) Int. Cl.
*A47C 1/00* (2006.01)
(52) U.S. Cl. ................................ 297/344.11
(58) Field of Classification Search ............ 297/344.11, 297/344.1, 344.13
See application file for complete search history.

(56) References Cited

U.S. PATENT DOCUMENTS

| | | | |
|---|---|---|---|
| 5,605,377 A * | 2/1997 | Tame | 297/341 |
| 6,048,030 A * | 4/2000 | Kanda et al. | 297/341 |
| 6,767,063 B1 * | 7/2004 | Abdella et al. | 297/378.12 |
| 6,799,800 B2 * | 10/2004 | Klahold et al. | 297/341 |
| 2004/0140704 A1 | 7/2004 | Abdella et al. | |

FOREIGN PATENT DOCUMENTS

| | | |
|---|---|---|
| EP | 0 589 759 A1 | 3/1994 |
| EP | 0 683 066 B1 | 11/1995 |
| GB | 2 255 903 | 11/1992 |
| WO | WO 95/19272 A2 | 7/1995 |

OTHER PUBLICATIONS

International Search Report for PCT/EP2005/053848, date of mailing. Oct. 11, 2006, 3 pages.

* cited by examiner

*Primary Examiner* — David Dunn
*Assistant Examiner* — David E Allred
(74) *Attorney, Agent, or Firm* — Butzel Long

(57) ABSTRACT

A memory device for blocking a component configured to move between an adjusting position and a functional position is provided. The memory device includes a housing configured to be coupled to the component, a blocking element pivotally coupled to the housing and a variable transmission mechanism coupled to the housing. The variable transmission mechanism is configured to transfer the movement of the component to the blocking element as a variable transmission when the component is moved from the adjusting position toward the functional position. According to one exemplary embodiment, the component is an adjustable easy entry vehicle seat.

18 Claims, 11 Drawing Sheets

MEMORY MECHANISM

CROSS-REFERENCE TO RELATED PATENT APPLICATIONS

The present Application is a National Phase Application of PCT/EP2005/053848 entitled, "Device for a Vehicle for Automatically Blocking a Component, in particular a Vehicle Seat, and a Vehicle Seat" filed on Aug. 4, 2005 which published under PCT Article 21(2) on Mar. 30, 2006 as WO 2006/032574 A2 in the German language, which claims priority to German Patent Application DE 10 2004 038 587.4 filed Aug. 6, 2004, the entire disclosure of which, including the specification and drawings, is expressly incorporated herein by reference.

BACKGROUND

The present disclosure relates generally to a memory device for a vehicle for automatically blocking a component, such as a vehicle seat, and to a vehicle seat having such a memory device.

It is generally known to provide a vehicle seat that allows for easier access to a rear seat by allowing for a displacement of the seat in a fore direction, in addition to a folding movement of the backrest in the fore direction. A vehicle seat of this type is often provided with a mechanism or stop device that allows an initial position, from which the seat has been displaced in the fore direction, to be retrieved. As a result, it is possible that after the vehicle seat is folded forward, for example for rear seat passengers to gain access to a rear seat, a previously adjusted position of the vehicle seat may be easily occupied again in a relatively simple manner. Known adjusting mechanisms that provide for this type of movement are often formed of a plurality of parts. As such, these adjustment mechanisms are, on the one hand, complicated and expensive to produce, and on the other hand, are susceptible to malfunction during their operating life. For example, with generally known devices of this type, the seat locking is carried out by spring-loaded locking devices, the possibility also arising that the spring action fails, so that correct locking of the seat is not guaranteed, or only insufficiently guaranteed.

Thus there is a need to provide a memory device that avoids the drawbacks of the known prior art and provides a more simple, lightweight device for a vehicle which may be manufactured and assembled more cost-effectively and which is more reliable over its operational life, for automatically blocking a component, in particular a vehicle seat.

SUMMARY

One exemplary embodiment relates to a device for a vehicle for automatically blocking a component, such as a vehicle seat, when a previously occupied adjusting position is reached and quitted, in the meantime, in order to occupy a different functional position, the adjusting position being provided to be able to be modified on the adjusting area of the component, the automatic blocking of the component being able to be carried out by means of a transmission mechanism and a blocking element, the transmission mechanism transferring the movement of the component from the adjusting position thereof to the functional position thereof and vice versa, to the blocking element by means of a variable transmission. As a result, a forced guidance of the blocking element is advantageously carried out so that it does not depend on the function of, for example, return springs or the like for the component, and/or the vehicle seat, to be blocked.

For purposes of the present disclosure, the phrase "variable transmission" is used broadly to refer to a control movement of variable intensity of the blocking element during the same movement of the transmission mechanism in various adjusting positions of the transmission mechanism.

According to another exemplary embodiment, in the vicinity of the adjusting position of the component, due to the variable transmission, a relatively large control movement of the blocking element may be carried out and that the control movement of the blocking element is otherwise relatively small. As a result, it is possible to carry out effective blocking of the component, in particular for indicating the adjusting position which has been originally occupied but which has been quitted in order to adjust a functional position. It is also possible, therefore, to provide a relatively large adjusting area of the component, without a large space requirement on the device, for example produced by the large gear wheels or other components which are required when guiding the component over the adjusting area.

According to another exemplary embodiment, the variable transmission is carried out by means of a wobble mechanism in the form of a hypocycloid gear assembly, in which one part of the gear assembly performs a hypocycloid movement. As a result, it is possible to implement a variable transmission in a manner which is, in particular, simpler, more compact and more stable.

According to another exemplary embodiment, the blocking element is coupled to the transmission mechanism by means of a pin-slot-connection. The variable transmission may thus be implemented in a manner which is, in particular, more simple, more effective and more robust.

According to another exemplary embodiment, the component is a vehicle seat and that a longitudinal displaceability of the component, in particular in the direction of a longitudinal axis of the vehicle, corresponds to the adjusting area of the component. As a result, it is possible to design the component as a vehicle seat, such as a vehicle front seat, so that, for example, passengers have a particularly high level of comfort for boarding into the rear seats of the vehicle.

Another exemplary embodiment relates to a vehicle seat with a memory device having one or more of the above features. The vehicle seat may be of particularly simple, robust and cost-effective design, but may have a large functional scope, such as for example a memory function for retrieving and/or indicating a previously adjusted adjusting position which is, however, quitted in order to adjust a different functional position therefrom.

DETAILED DESCRIPTION

Referring generally to the Figures, a memory device and components thereof are shown according to exemplary embodiments. The memory device 30 is described and illustrated herein with reference to a vehicle seat, but is suitable for use with components other than vehicle seats including, but not limited to, a steering wheel, sliding roof, trunk lid or the like. As such, the terms "component" and "vehicle seat" are used substantially synonymously herein. The particular vehicle seat described herein is provided with an easy entry function. For purposes of the present disclosure, the phrase "easy entry function" is used broadly to refer to a displacement of the vehicle seat to provide access to, for example, the vehicle rear seat bench or, on the other hand, to vehicle seating located behind the vehicle seat. Such a vehicle seat may be suitable, for example, for a two-door vehicle.

To facilitate access, or easy entry, to a rear row of seats, after folding down a backrest of a front seat, the vehicle seat and/or the front seat may be pushed in a fore direction along seat rails a distance sufficient to provide access to the rear row of seats. When subsequently pushing the seat back in an aft direction, the seat is generally intended to move back as far as the last adjusted longitudinal position. To this end, the device 30 is a "memory" device that "notes" the previously adjusted adjusting position which is, however, quitted subsequently and, when pushing the seat back (and/or generally the component), stops the seat at the previously adjusted adjusting position. The adjusting position is also referred hereinafter as the memory position.

According to an exemplary embodiment, a counter mechanism measures the path of displacement of the vehicle seat from the adjusting position and/or memory position to be noted into, for example, the position and/or functional position which is furthest forward, which hereinafter is also referred to as the easy entry position. When pushed back, the seat is moved back by exactly the same distance and stops again at the previously adjusted, but quitted, seating position (i.e., the adjusting position). The vehicle seat and/or the component as a whole may, for example, be locked via a seat upper rail 9 and a seat lower rail 10 and via a locking device (not shown) that may be manually or automatically actuated into various longitudinal positions inside the vehicle.

Figure 1:
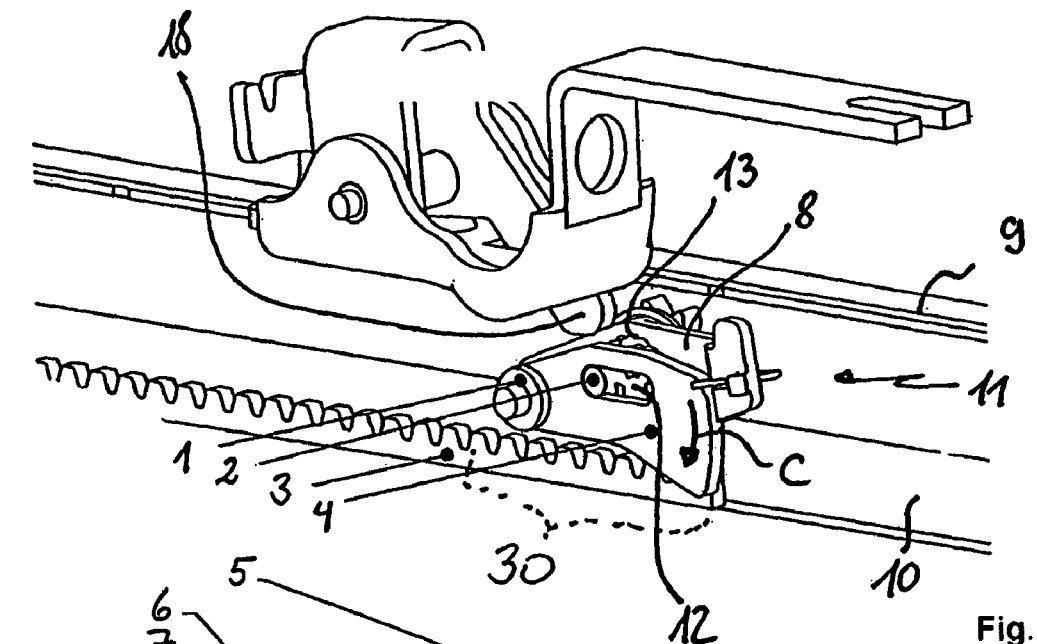
FIG. 1 is a partial perspective view of a memory device according to an exemplary embodiment provided on a track for a vehicle seat.
Figure 2:
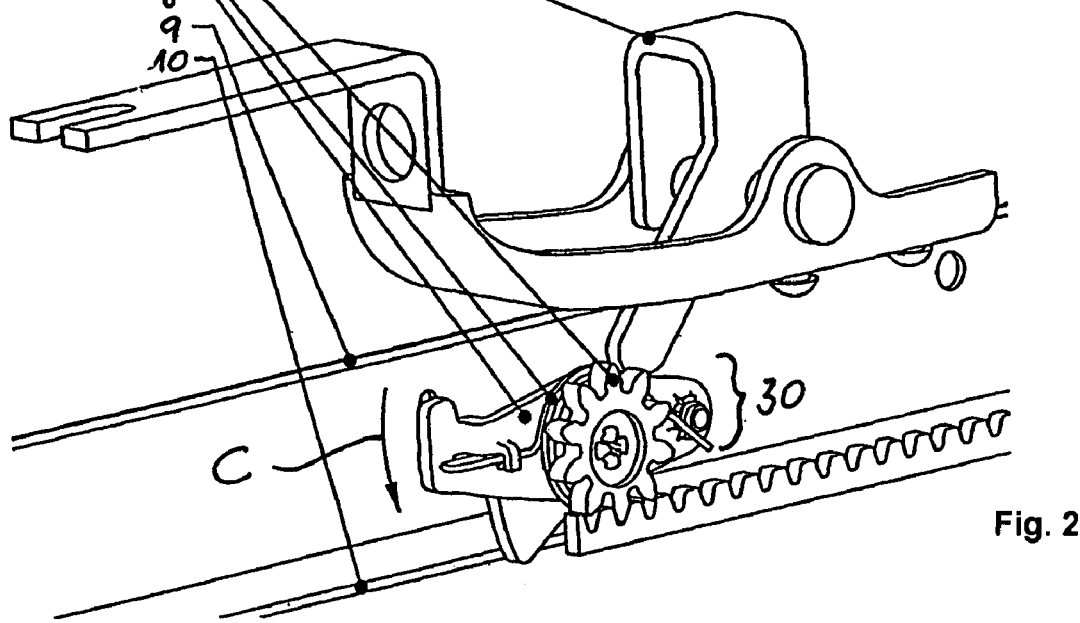
FIG. 2 is an alternate partial perspective view of the memory device of FIG. 1.

Referring to FIGS. 1 and 2 in particular, perspective views are respectively illustrated of the device according to an exemplary embodiment. The device is denoted in the figures by the reference numeral 30, the same reference numerals in different figures denoting the same parts of the device 30 or of the component. The device 30 is shown as being used in combination with a seat track, shown as an upper rail 9 and a lower rail 10. In addition to the upper rail 9 and the lower rail 10, an oscillating lever 18 for activating the device 30, a toothed rack 3, a wobble mechanism core 2, a bearing pin 1, a slot 12, a counter mechanism 11, a housing 8, a control spring 7 and an internal toothing 13 are shown in FIGS. 1 and 2.

FIG. 1 shows the device 30 substantially in perspective from one side and FIG. 2 shows the device 30 from a different angle of view, substantially the opposing side. In FIG. 1 and in FIG. 2, an arrow C indicates the movement of the device 30, which leads to an activation of the device 30. In the example of a vehicle seat as a component, by folding down a backrest of the vehicle seat, not shown, the housing 8 is pivoted downward about the bearing pin 1 by means of the oscillating lever 18 cooperating with the backrest, so that a drive wheel 6 engages in the toothed rack 3 supported relative to the lower rail 10. This movement is indicated by the arrow C in FIGS. 1 and 2.

Figure 3:
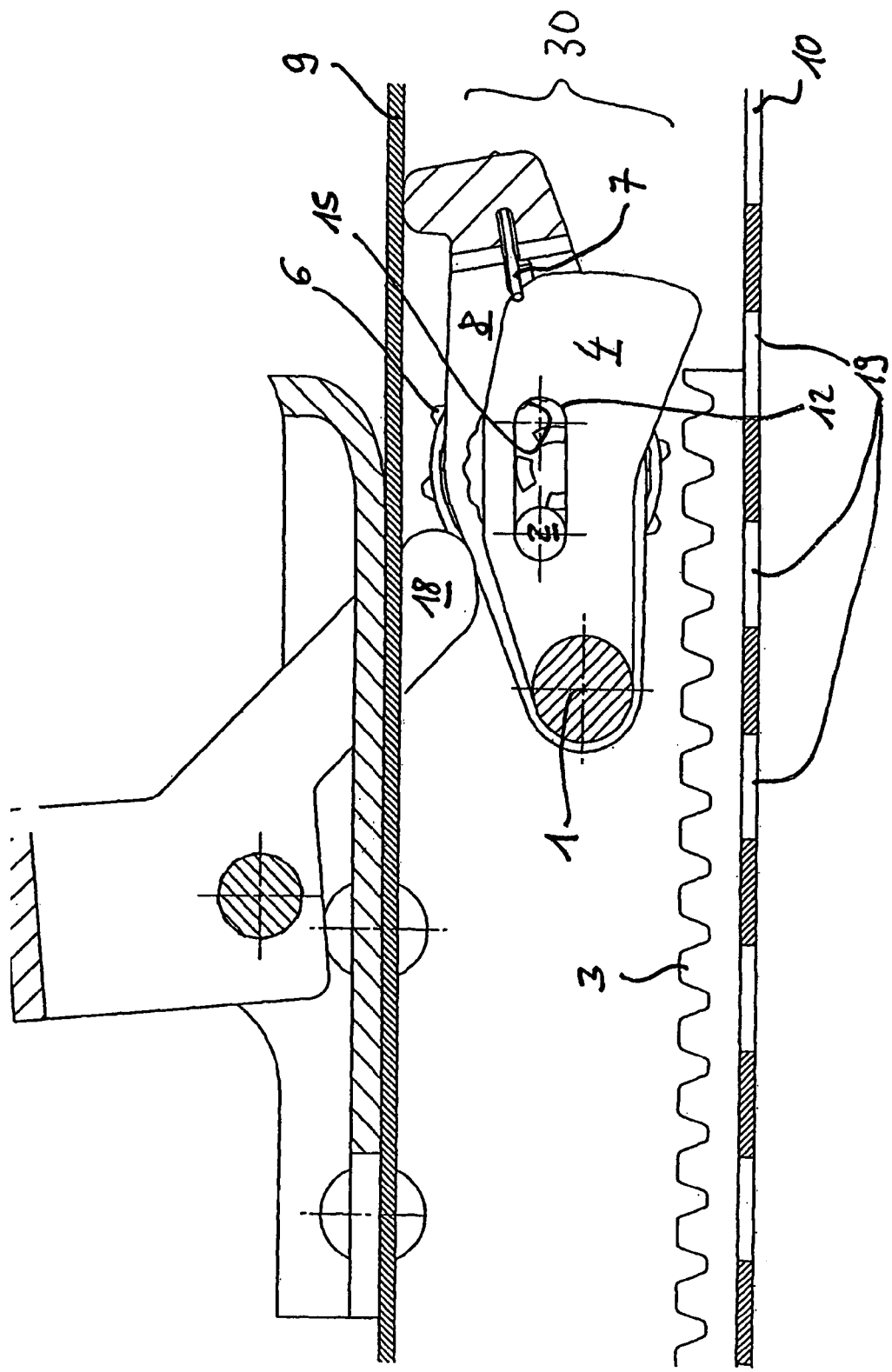
FIG. 3 is a partial side view of the memory device of FIG. 1.

A side view of the device 30 is shown in FIG. 3. In FIG. 3, the device 30 is adjusted into its inactive position. Should a manually releasable locking device (not shown) be unlocked for the longitudinal displacement of the component and/or the vehicle seat, the seat (i.e. the upper rail 9) may be freely moved relative to the lower rail 10 and adjusted into a position (e.g., one of a plurality of adjustable latching positions, etc.). Although only slightly visible in FIG. 3, a wobble mechanism pinion 15 is provided in the device 30 for the control system. Referring further to FIG. 3, a pawl toothing 19 is indicated which, when activating the device 30, is able to cooperate with a blocking element, shown according to an exemplary embodiment as a pawl 4.

Figure 4A:
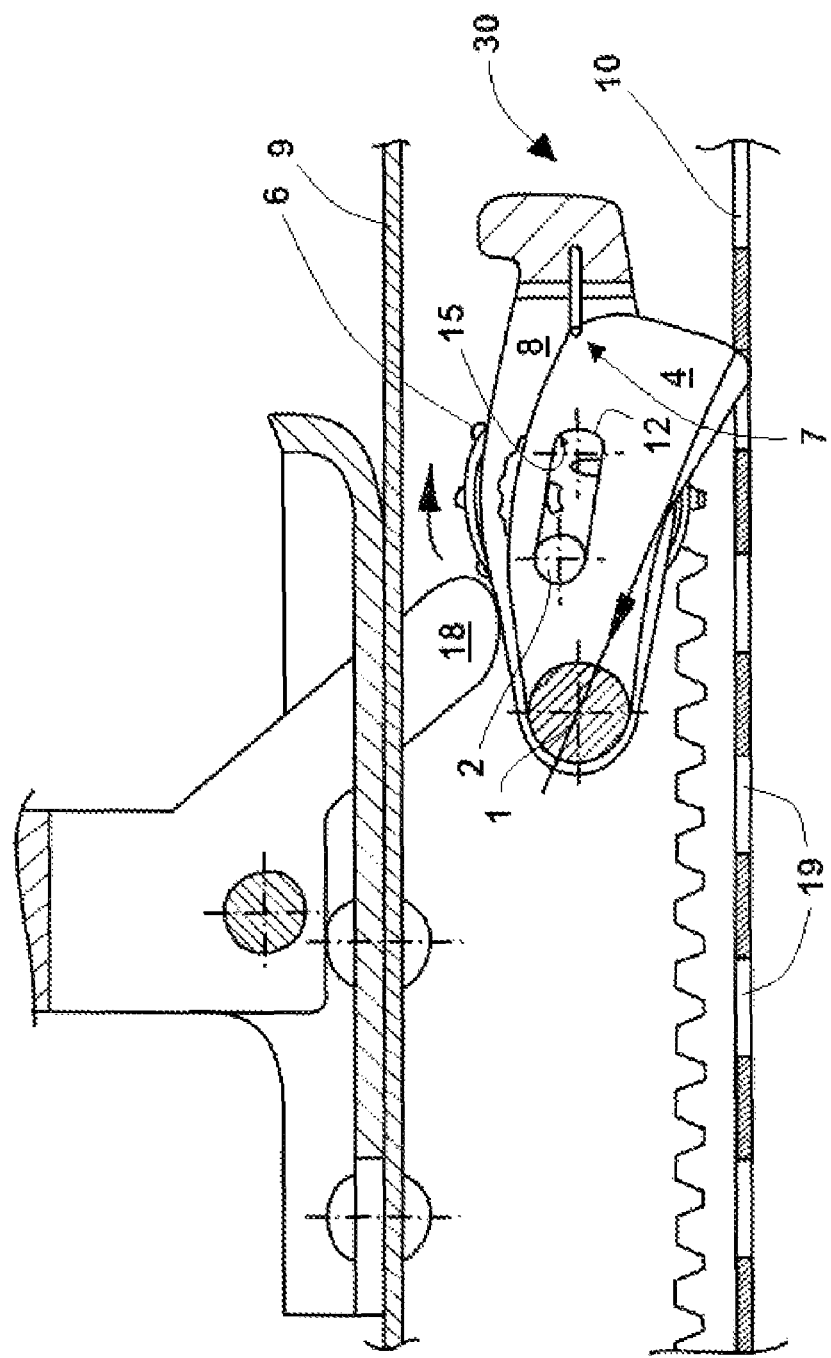
FIG. 4A is a partial side view and FIG. 4B is a plan view of the memory device of FIG. 1 in a first position.
Figure 4B:
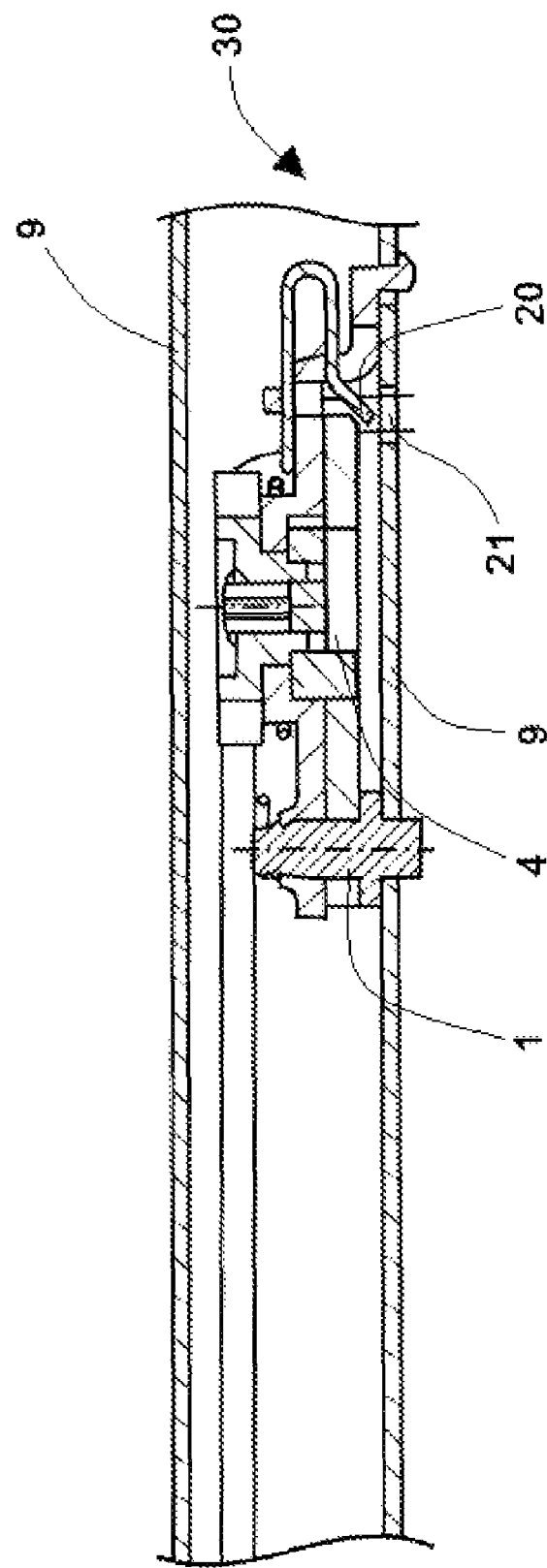
Figure 5A:
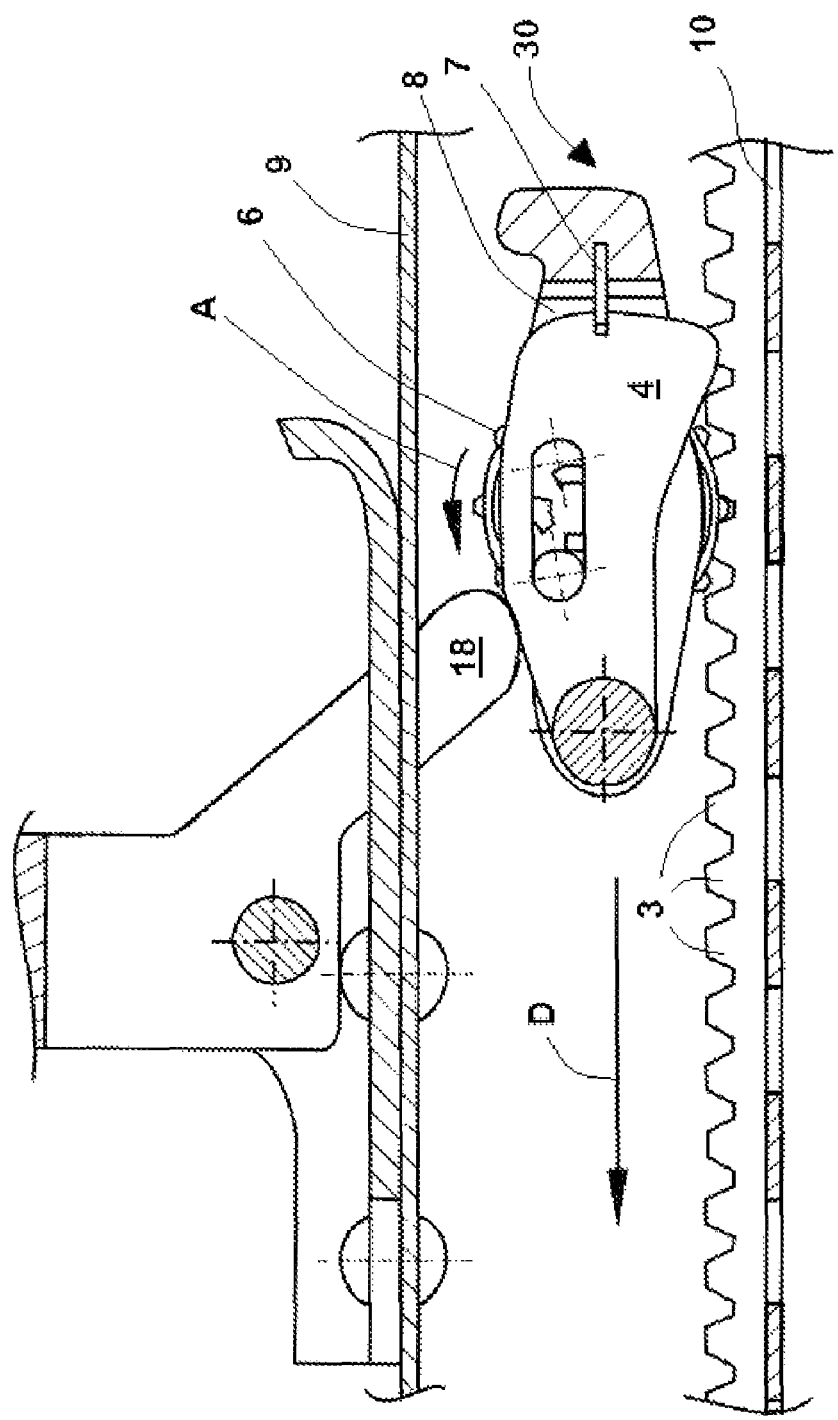
FIG. 5A is a partial side view and FIG. 5B is a plan view of the memory device of FIG. 1 in a second position.
Figure 5B:
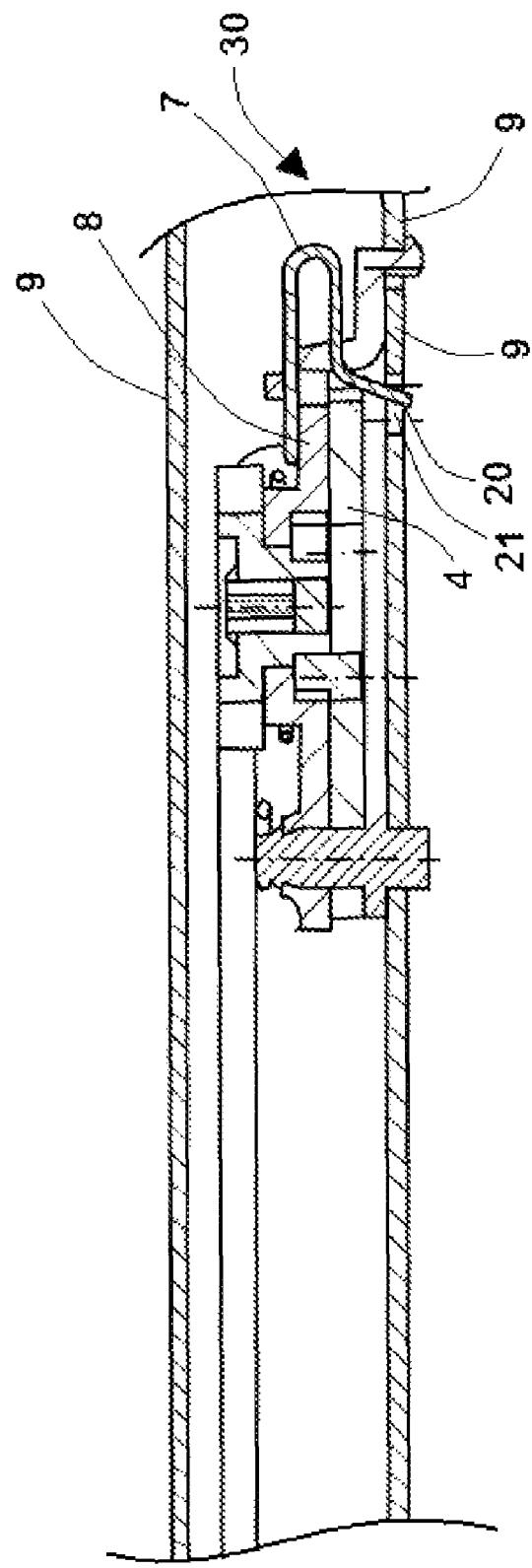
Figure 6A:
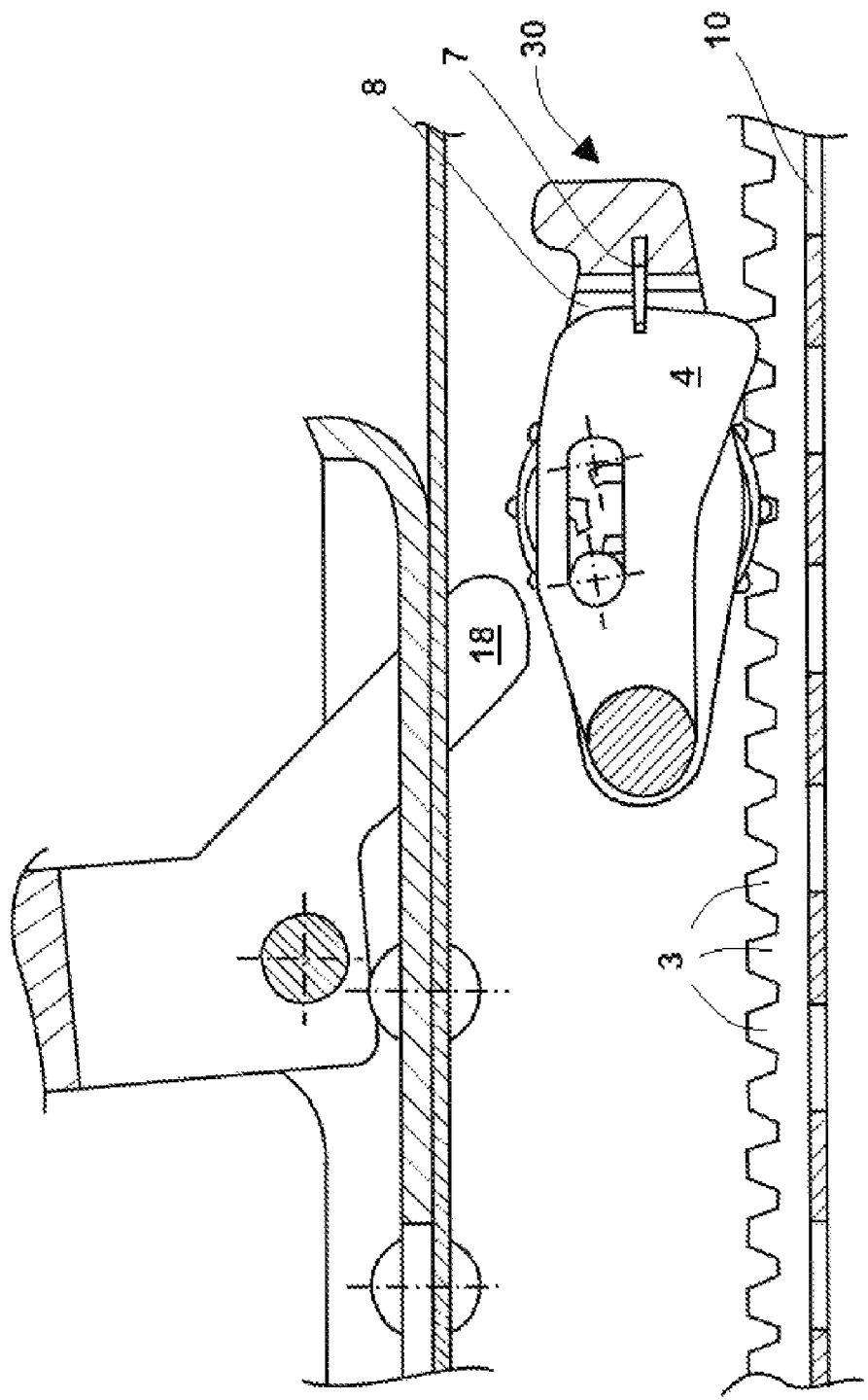
FIG. 6A is a partial side view and FIG. 6B is a plan view of the memory device of FIG. 1 in a third position.
Figure 6B:
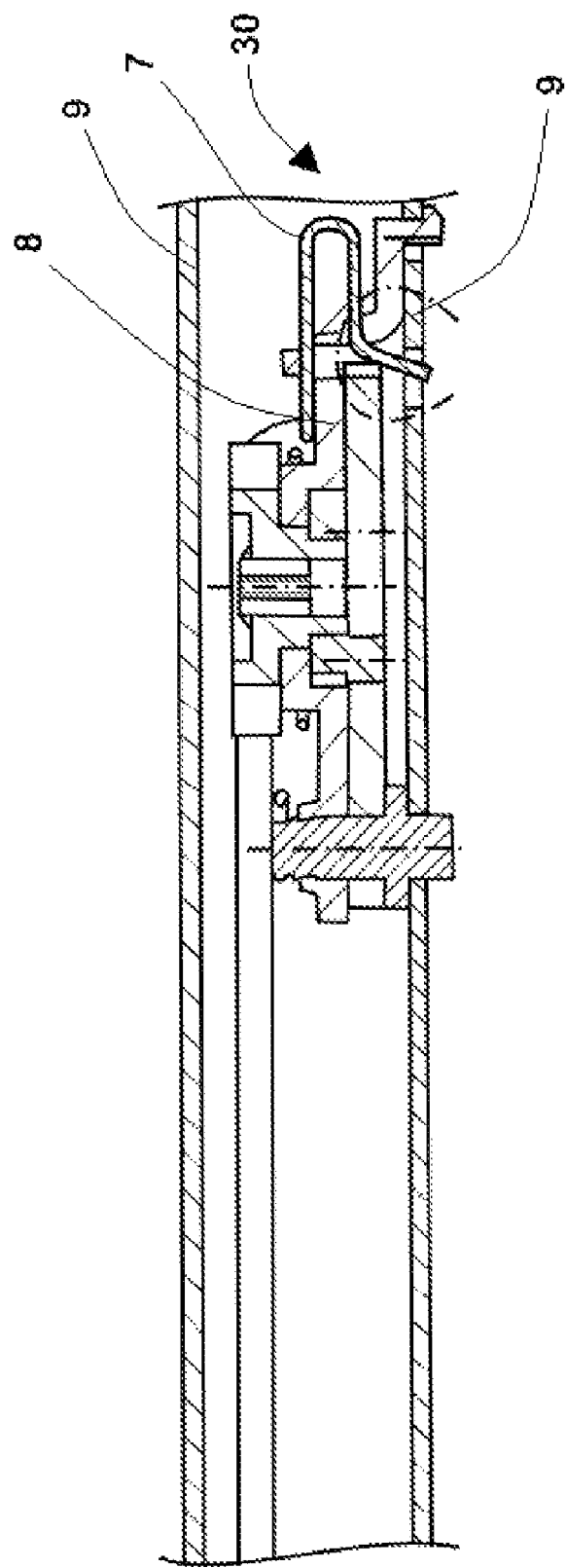

A side view of a device 30 and a plan view in the lower part of the figures are respectively shown in FIGS. 4, 5 and 6. In FIG. 4, the device 30 is adjusted into its activated position by the oscillating lever 18. As a result, the device 30 is pivoted downward about a bearing pin 1. The angular relationship of the housing 8 of the device 30 relative to the pawl 4 of the device 30 is such that the lower end of the pawl 4 is in engagement with the pawl toothing 19 on the lower rail 10. These adjustments of the device 30 are, to a certain extent, the starting and target positions for carrying out the function on the component, in particular on a vehicle seat in the example.

FIG. 5 shows that by means of a displacement of the component (i.e., a modification of the adjusting position of the component in the direction of the functional position of the component), for example an easy entry position of a vehicle seat, the angular relationship between the pawl 4 and the housing 8 of the device 30 is modified in a controlled manner. The movement of the component and/or the seat is shown in FIG. 5 by an arrow D, which indicates the direction of movement of the upper rail 9 relative to the lower rail 10, the device 30 being adjusted to its activated position. In this position, the drive wheel 6 is rotated along the toothed rack 3 such that the angular relationship and/or the angular position is modified between the pawl 4 and the housing 8 of the device 30. The rotation of the drive wheel 6 is shown in FIG. 5 by an arrow A.

Referring to FIG. 6, the situation is shown in which the oscillating lever 18 no longer holds the device 30 in its active position. This is, for example, the case when a vehicle seat is still adjusted in the easy entry position thereof, namely relative to the longitudinal displacement thereof (i.e., is generally pushed toward the front but, with regard to the backrest adjustment of the seat, is already adjusted to its normal position). In this case, for example, the oscillating lever 18 connected to the backrest would no longer be able to hold the device 30 in its active position. According to an exemplary embodiment, this task is undertaken in the device 30 by a control element, shown according to an exemplary embodiment as a control spring 7. According to various alternative embodiments, the control element may be designed as a control slider.

Figure 7:
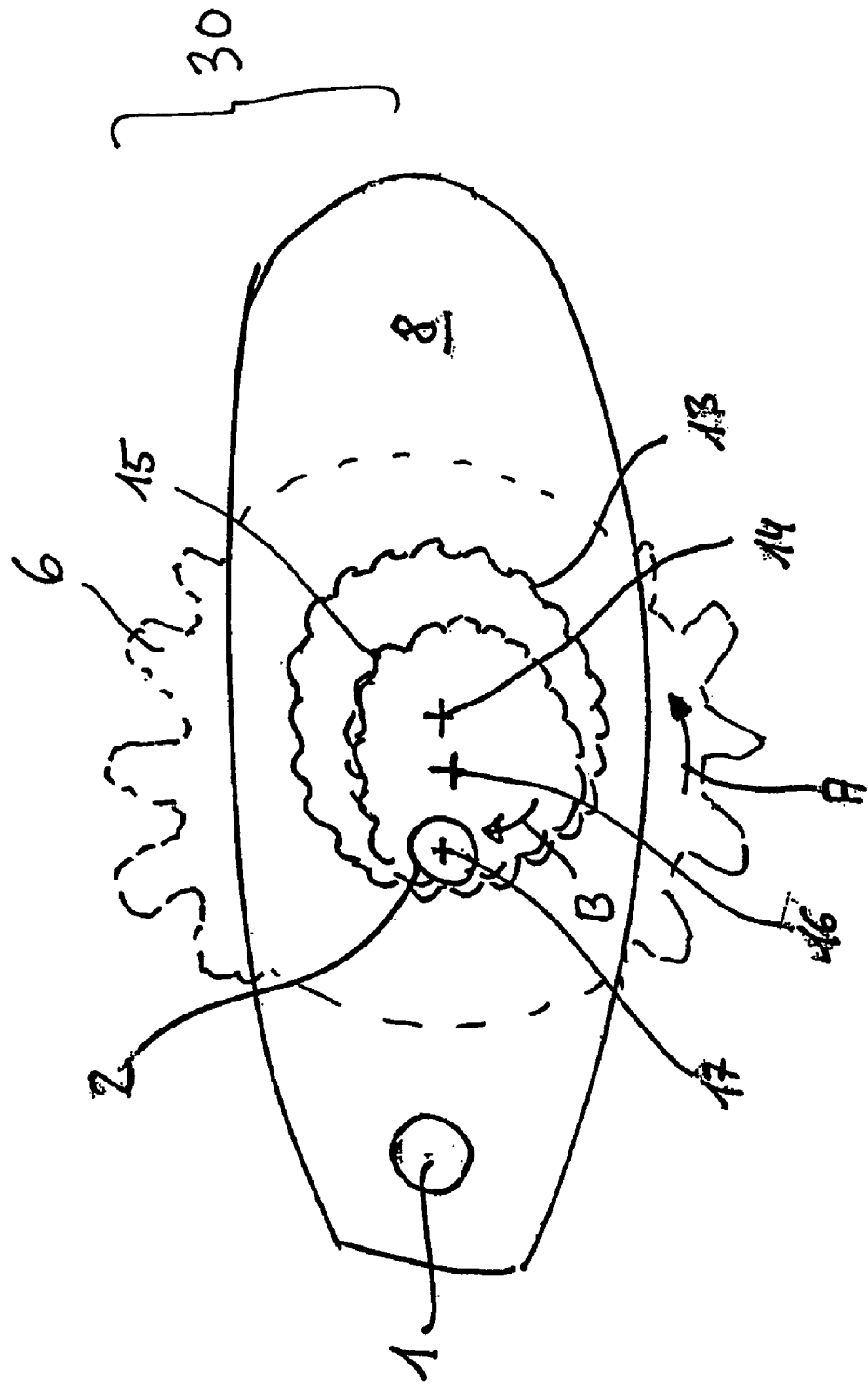
FIG. 7 is a partial schematic view of a portion of the memory device of FIG. 1
Figure 7A:
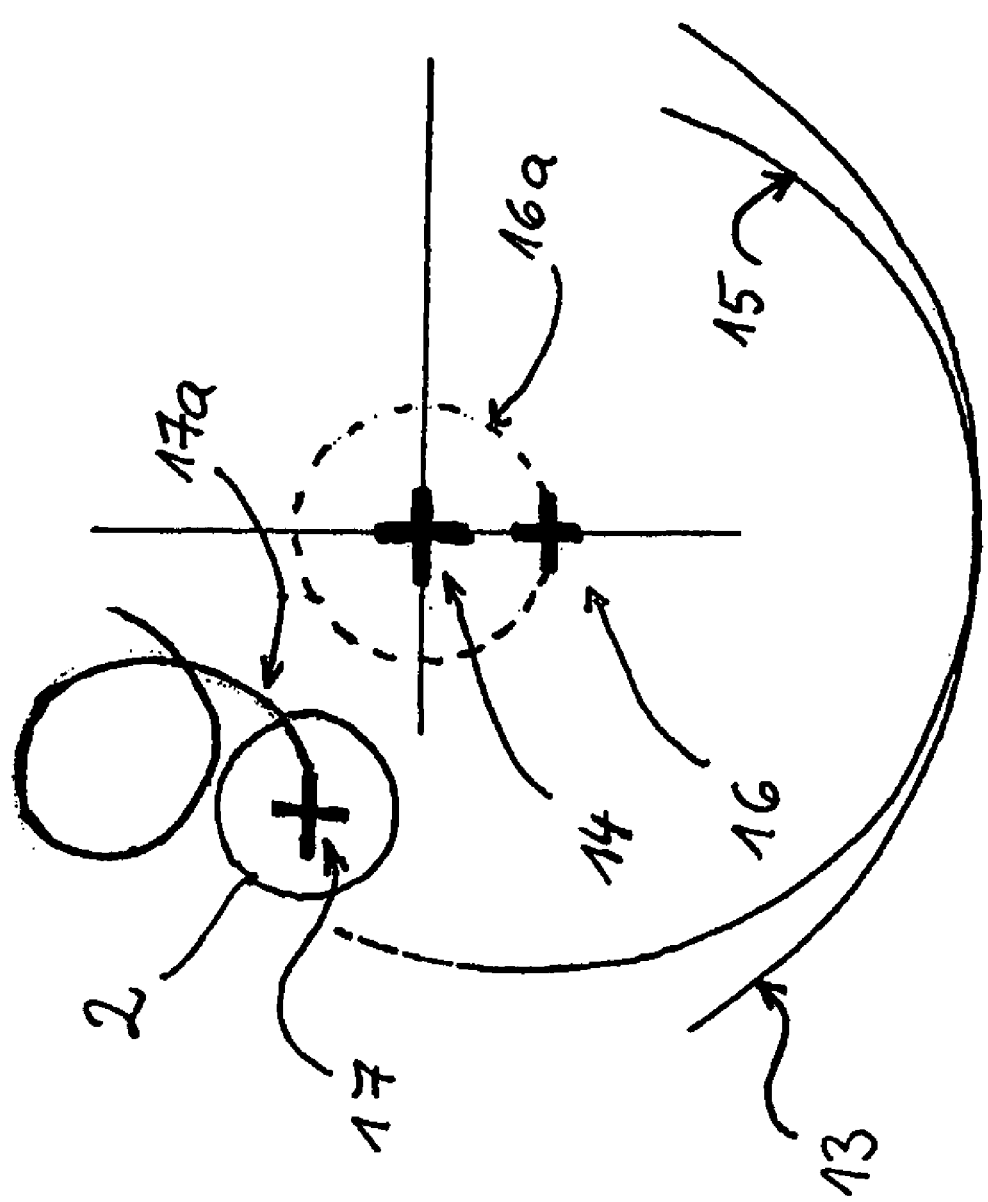
FIG. 7a is a partial schematic view of a portion of the memory device of FIG. 1 showing a travel path of a point on the memory device.
Figure 8:
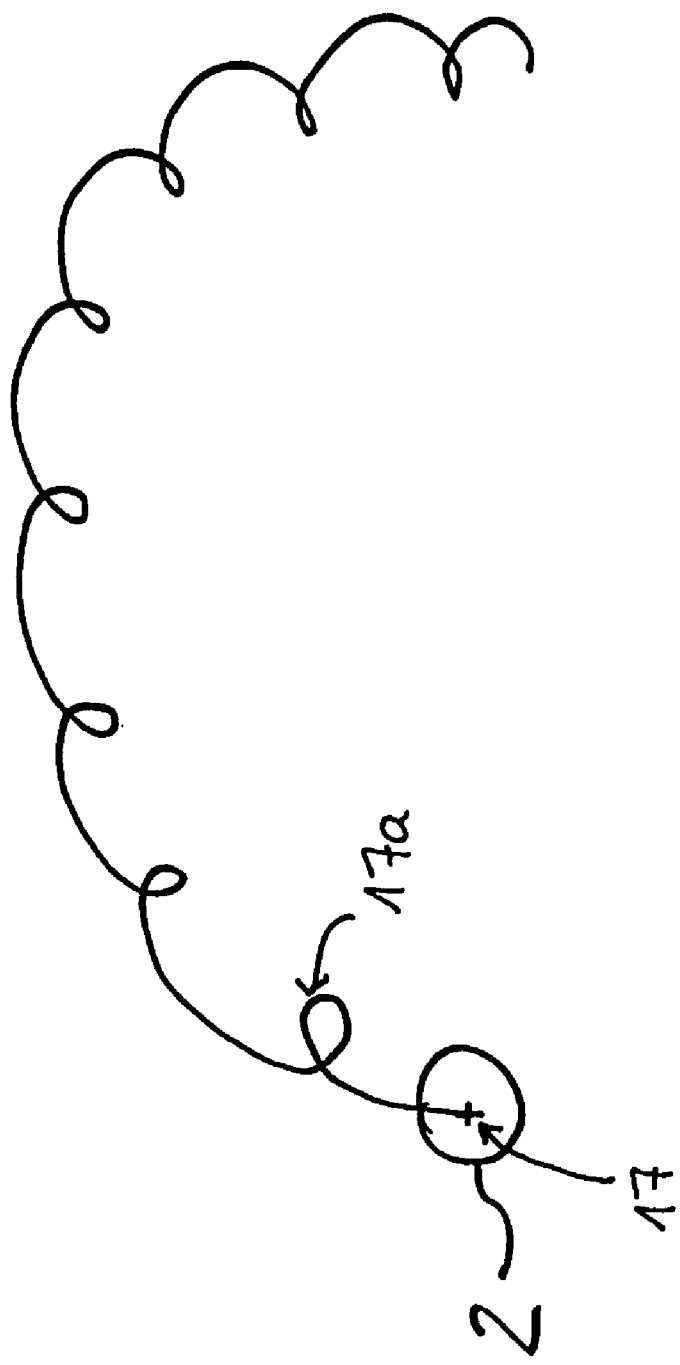
FIG. 8 is a partial schematic view of a portion of the memory device of FIG. 1 showing a travel path of a point on the memory device.

Referring to FIGS. 7, 7a and 8, the functional mechanism of the device 30 is shown according to an exemplary embodiment. Referring to FIG. 7 in particular, the housing 8 of the device 30, which may be pivoted about the bearing pin 1, is shown. According to an exemplary embodiment, the drive wheel 6 is arranged on one side of the housing 8 and comprises an external toothing which is able to cooperate with the toothed rack 3. According to an exemplary embodiment, the device 30 comprises an internal toothing 13 that is provided, in particular, on the housing 8. The drive wheel 6 is rotatably arranged concentrically to the internal toothing 13 about a first rotational axis 14. The drive wheel 6 has a bearing facility for the wobble mechanism pinion 15, eccentrically to the first rotational axis 14, the wobble mechanism pinion 15 being rotatable by means of the bearing facility about a second axis 16 (eccentric to the first axis 14).

In addition to the bearing of the wobble mechanism pinion 15 about the second axis 16, the wobble mechanism pinion 15 also comprises an external toothing (which is not denoted by a reference numeral) that meshes with the internal toothing 13. The movement of the wobble mechanism pinion 15 is thus completely determined by the rotational position of the drive wheel 6. The wobble mechanism pinion 15 further comprises the wobble mechanism core 2, which is, in particular, integrally connected thereto, and which in turn is arranged eccentrically to the second rotational axis 16.

According to an exemplary embodiment, the wobble mechanism core 2 is provided as a pin which is arranged in the slot 12. The pin 2 and/or the wobble mechanism core 2 have a center point (and/or an axis of symmetry) which is also denoted hereinafter as the third rotational axis 17. Thus, with a rotation of the drive wheel 6 in the direction of the arrow A in FIG. 7, the wobble mechanism pinion 15 carries out a movement in the direction of the arrow B (at least relative to the internal toothing 13). As a result, the third rotational axis 17 carries out a spiral movement, which firstly has a circular component of motion corresponding to the movement of the second rotational axis 16 about the first rotational axis 14 and which moreover carries out a second component of motion corresponding to the circulation of the wobble mechanism core 2 and/or the third rotational axis along the internal toothing 13 (in the direction of movement according to the arrow B).

The spiral movement of the third rotational axis 17 and/or the wobble mechanism core 2 is shown in FIG. 7a and in FIG. 8 in outline and is denoted by the reference numeral 17a. According to an exemplary embodiment, this movement is a hypocycloid movement that is caused by the wobble mechanism. Referring to FIG. 7a in particular, the first rotational axis 14, the second rotational axis 16, a circle of movement 16a which represents the movement of the second rotational axis 16, the wobble mechanism pinion 15 and the internal toothing 13 are shown. For the sake of simplicity, neither the toothing of the wobble mechanism pinion 14 nor the internal toothing 13 is shown in detail, i.e. the teeth of the respective toothings.

Due to the arrangement of the third rotational axis 17 relative to the bearing pin 1, about which the pawl 4 may be rotated, the angular position between the housing 8 and the pawl 4 (not shown in FIG. 7) is modified due to the movement of the wobble mechanism core 2 by a rotation of the drive wheel 6, and namely such that the pawl 4 is raised and comes out of engagement with the pawl toothing 19. By varying the number of teeth between the internal toothing 13 and the external toothing of the wobble mechanism pinion 15 it is possible for the drive wheel 6 to carry out a plurality of rotations without the wobble mechanism core 2, and thus the pawl 4, being returned to an angular position relative to the housing 8 which leads to an engagement of the pawl 4 in the pawl toothing 19. As a result, it is possible that the adjusting area of the adjusting facility of the component, in particular, as longitudinal displacement, may be selected to be relatively large, in particular such that far more than two revolutions of the drive wheel 6 may be carried out. As a result, it is possible to design the drive wheel 6 to be relatively small and thus to design the entire device to be relatively compact, lightweight and cost-effective.

During normal use of the component and/or the seat, the device 30 does not cooperate with the toothed rack 3. This means that the oscillating lever 18 (and/or an alternative release means when the component has a different shape) leave the device 30 deactivated. According to an exemplary embodiment, the device 30, with an adjustable component, is connected on an adjusting device of the component or connected to an adjusting device of the component. According to the embodiment illustrated, the device 30 is connected to the upper rail 9 of the seat adjustment and pivotably fastened to the bearing pin 1. The externally toothed drive wheel 6 is rotatably arranged on the device 30, in particular on the housing 8 of the device 30, naturally a further toothing or a further cooperation being connected to a complementary part of the adjustable component, in the present case the drive wheel 6 being able to be connected to the toothed rack 3 fastened to the seat lower rail 10.

In normal use of the seat, the housing 8 is raised with the drive wheel 6 by the control spring 7 acting on the bearing pin 1 and/or acting on the rotation of the housing 8 about the bearing pin 1 such that the device 30, and thus the drive wheel 6, are kept out of engagement with the toothed rack 3 (see FIG. 3). The drive wheel 6 acts via the wobble gear as a transmission mechanism on the wobble mechanism core 2 which, in turn, forcibly moves the pawl 4 by means of the slot 12. The transmission mechanism comprises, in particular, the wobble gear with the internal toothing 13, in particular in the housing 8, which extends about the first rotational axis 14 (of the drive wheel 6). On the rear face of the drive wheel 6 the wobble mechanism pinion 15 is arranged with the second rotational axis 16 thereof, in particular connected to the drive wheel 6 by means of a clip connection. When the drive wheel 6 rotates, the wobble mechanism core 2 carries out a first circular movement with a superimposed loop movement (wobble movement) as shown in FIGS. 7a and 8.

After activating the device 30, for example by the action of the oscillating lever 18 when folding down the backrest of a vehicle seat, both the toothing of the drive wheel 6 engages in the toothed rack 3 and the pawl 4 in the pawl toothing 19 of the seat lower rail 10 and, in the present example of a seat, releases a rail lock (not shown). Thereafter, the seat may be pushed forward relative to the upper and lower rails 9 into the easy entry position thereof, whereby due to the rotation of the drive wheel 6 the pawl is raised from the pawl toothing 19 and is displaced with the upper rail 9 along the pawl toothing 19 into the easy entry position along the arrow D (see FIG. 5).

As the pawl 4 follows the movement of the wobble mechanism core 2, the pawl 4 is rapidly raised from the pawl toothing 19. As a result of the variable transmission of the transmission mechanism, it is possible that the vehicle seat is now displaced toward the front without further contact between the pawl 4 and the pawl toothing 19. Due to the position of the pawl 4, the end 20 of the control spring 7 is continuously engaged between the drive wheel 6 and the toothed rack 3, even when the device 30 is not held by the oscillating lever 18 in the direction of engagement between the drive wheel 6 and the toothed rack 3, as the control spring 7 according to the plan view in FIG. 5 (see in contrast to the view in FIG. 4) is engaged in a recess 21 of the upper rail 10.

The control spring 7 is engaged in the recess 21 when the pawl 4 is adjusted into the raised position (i.e., is not in engagement with the pawl toothing 19) at the end 20 thereof. According to various alternative embodiments, the control element (e.g., the control spring 7, etc.) may be implemented by means of a slider which is controlled by the position of the pawl 4. According to the embodiment illustrated, the projecting end 20 of the control spring 7 is brought into a position by the pawl 4 so that the projecting end 20 of the control spring 7 is inserted into the lateral recess 21 of the seat upper rail 9. Thus, each further pivoting movement between the housing 8 and the seat upper rail 9 is blocked.

When pushing back the seat with the backrest folded down, when reaching the initial position and/or the memory position, which at the same time corresponds to the adjusting position of the seat, in contrast to the functional position thereof, the pawl 4 is pivoted back equally rapidly (as when quitting the adjusting position) into the pawl toothing 19, and thus immediately blocks the longitudinal adjustment and/or longitudinal displacement of the seat and/or generally the component. At the same time, the control spring 7 and/or the end 20 of the control spring 7 engaging in the lateral recess 21 of the seat upper rail 9 is displaced out of the lateral recess 21 of the seat upper rail 9, so that with the subsequent folding up of the backrest, the housing 8 is able to be raised and the drive wheel 6 comes out of engagement with the toothed rack 3. As a result, the functional cycle of the device 30 is carried out and the device 30 again occupies the initial position or neutral position (see FIG. 3), until by means of a further folding down of the backrest from a possibly different longitudinal adjustment of the vehicle seat, the carrying out of the functional cycle of the device is again triggered.

In the vicinity of the adjusting position of the seat (i.e., when the pawl 4 and/or the blocking element 4 carry out or release the blocking of the seat), the movement of the pawl 4, due to a specific displacement path of the seat (for example approximately 5 mm) and due to a movement of the transmission mechanism corresponding to this displacement path, is considerably greater than the movement of the pawl 4 due to a displacement of the seat over the same displacement path (for example approximately 5 mm), namely in the region of the functional position of the seat. This variable effect of a similar displacement path (and/or a corresponding movement of the transmission mechanism), on different movements of the pawl 4 depending on different adjusting positions of the seat, is referred to in the present disclosure as variable transmission between the transmission mechanism and the blocking element.

If the seat, however, is displaced to the rear from a position between the memory position and the functional position, with the backrest folded up (i.e. without the action of the oscillating lever 18 or a further release means and with a manually released locking device for the seat upper rail and seat lower rail 9, 10, the housing, 8 together with the pawl 4, shoots immediately upward, as soon as the control spring 7 and/or the end 20 thereof engaging in the recess 21 of the upper rail 9 quit the recess 21. The seat may, therefore, be also displaced without noticeable hesitation as far as a position behind the memory position (i.e. from the functional position into a position on the other side of the memory position) and locked there.

It should again be noted that the memory device disclosed herein is suitable for use with other components, in particular in or on a vehicle, for example a motor vehicle, and for example may be used with a different seat-adjusting facility from the longitudinal displacement of the seat or with an adjustment of the steering wheel, the sliding roof, a trunk lid or the like.

The invention claimed is:

1. A memory device for blocking a vehicle seat configured to move between an adjusting position and a functional position, the memory device comprising:
   a housing configured to be coupled to the vehicle seat;
   a blocking element pivotally coupled to the housing; and
   a variable transmission mechanism coupled to the housing and configured to transfer the movement of the vehicle seat to the blocking element as a variable transmission when the vehicle seat is moved from the adjusting position toward the functional position, wherein the variable transmission mechanism is a wobble mechanism comprising a wobble pinion and a wobble core.

2. The memory device of claim 1, wherein the variable transmission mechanism comprises:
   a drive gear rotatable about a first axis and having external toothings;
   internal toothings located concentric with the first axis;
   the wobble pinion coupled to the drive gear at a second axis and having external toothings in meshing engagement with the internal toothings; and
   the wobble core supported on the wobble pinion at a third axis and engageable with the blocking element;
   wherein the second axis and the third axis are spaced from the first axis.

3. The memory device of claim 2, wherein the wobble core carries out a first substantially circular movement with a superimposed loop movement as the drive gear rotates.

4. The memory device of claim 2, wherein the number of external toothings on the wobble pinion is less than the number of internal toothings.

5. The memory device of claim 2, wherein internal toothings are defined by the housing.

6. The memory device of claim 5, wherein the drive gear is supported at a first side of the housing and the blocking device is supported at a second side of the housing.

7. The memory device of claim 6, further comprising a rack and wherein the external toothings of the drive gear are configured to be selectively engageable with the rack when the vehicle seat moves out of the adjusting position.

8. The memory device of claim 7, further comprising a lever and wherein the lever acting on the housing moves the external toothings of the drive gear into engagement with the rack.

9. The memory device of claim 8, further comprising a control element for biasing the external toothings of the drive gear out of engagement with the rack when the vehicle seat is in the adjusting position.

10. The memory device of claim 9, wherein the control element is a spring.

11. The memory device of claim 2, wherein the blocking element is a pawl having a free end configured to engage an aperture for blocking movement of the vehicle seat.

12. The memory device of claim 11, wherein the pawl defines a slot configured to receive the wobble core.

13. An adjustable easy entry vehicle seat configured to move between an adjusting position and a functional position, the vehicle seat comprising:
   a seat track having a first track member and a second track member, the first track member being movable relative to the second track member;
   a seat base part supported at the first track member,
   a seat backrest pivotally supported relative to the seat base part; and a memory device coupled to the first track and comprising a housing, a blocking element pivotally coupled to the housing and a variable transmission mechanism coupled to the housing, wherein the variable transmission mechanism of the memory device is configured to transfer the movement of the vehicle seat to the blocking element as a variable transmission when the vehicle seat is moved from the adjusting position toward the functional position, wherein the variable transmission mechanism is a wobble mechanism comprising a wobble pinion and a wobble core.

14. The system of claim 13, wherein the transmission mechanism of the memory device comprises:

a drive gear rotatable about a first axis and having external toothings;

internal toothings located concentric with the first axis;

the wobble pinion coupled to the drive gear at a second axis and having external toothings in meshing engagement with the internal toothings; and the wobble core supported on the wobble pinion at a third axis and engageable with the blocking element;

wherein the second axis and the third axis are spaced from the first axis.

15. The system of claim 14, wherein the wobble core carries out a first substantially circular movement with a superimposed loop movement upon the rotation of the drive gear.

16. The system of claim 13, wherein the first track is an upper track and the second track is a lower track.

17. A method of returning a vehicle seat to a previously adjusted position, the method comprising:

providing a vehicle seat that is pivotable between a use position and an entry position and displaceable in a fore and aft direction so that the vehicle seat is moveable between an adjusting position and a functional position, the vehicle seat having a seat base part and a seat backrest;

providing a memory device for returning the vehicle seat to the adjusting position after the vehicle seat has been moved to the functional position; and providing a blocking element for blocking the displacement of the vehicle seat in the aft direction once the memory device notes that a longitudinal displacement of the adjusting position has been achieved, wherein the memory device has a variable transmission mechanism transferring the displacement of the vehicle seat to the blocking element as a variable transmission when the vehicle seat moves from the adjusting position toward the functional position, wherein the variable transmission mechanism is a wobble mechanism comprising a wobble pinion and a wobble core.

18. The method of claim 17, wherein the variable transmission mechanism comprises:

a drive gear rotatable about a first axis and having external toothings;

internal toothings located concentric with the first axis;

the wobble pinion coupled to the drive gear at a second axis and having external toothings in meshing engagement with the internal toothings; and the wobble core supported on the wobble pinion at a third axis and engageable with the blocking element;

wherein the second axis and the third axis are spaced from the first axis.

* * * * *